United States Patent [19]

Korte et al.

[11] 4,122,136

[45] Oct. 24, 1978

[54] ACRYLONITRILE CONTAINING COPOLYMERS BLENDS AND PROCESS FOR THEIR PREPARATION

[75] Inventors: Siegfried Korte, Leverkusen; Carlhans Süling, Odenthal, both of Germany

[73] Assignee: Bayer Aktiengesellschaft, Leverkusen, Germany

[21] Appl. No.: 788,294

[22] Filed: Apr. 18, 1977

[30] Foreign Application Priority Data

Apr. 22, 1976 [DE] Fed. Rep. of Germany ....... 2617570

[51] Int. Cl.$^2$ .............................................. C08L 33/20
[52] U.S. Cl. ........................... 260/898; 260/29.6 AN; 260/29.6 T; 526/64; 526/331
[58] Field of Search ................ 260/29.6 AN, 29.6 T, 260/881, 898; 526/64, 331

[56] References Cited

U.S. PATENT DOCUMENTS

| | | | |
|---|---|---|---|
| 2,757,165 | 7/1956 | Slocombe | 526/331 |
| 2,840,447 | 6/1958 | Green | 260/881 |
| 3,351,602 | 11/1967 | Dunnavant et al. | 260/881 |

*Primary Examiner*—Harry Wong, Jr.
*Attorney, Agent, or Firm*—Connolly and Hutz

[57] ABSTRACT

Acrylonitrile/vinyl acetate/styrene copolymers containing a high proportion of acrylonitrile (50–80% by weight) which undergo no discoloration and result in highly transparent products when thermoplastically processed are produced by continuous emulsion copolymerization the monomers in a tube reactor in which comparatively little back mixing occurs (plug flow = laminar flow = non-stationary state). A seed latex having a specified, small particle size with a narrow particle size distribution of the copolymer is obtained; the reaction mixture is then cooled, if necessary, in order to prevent further polymerization as far as possible and continuously transferred into a stirrer vessel while at the same time a stream of monomers consisting of acrylonitrile, vinyl acetate and styrene also having a specified but different percentage composition of monomers than in stage 1 is also fed into this stirrer vessel, and in this second stage of the process, polymerization is carried out at specified temperatures and with specified residence times under stationary conditions, i.e. with back mixing up to a total conversion of 70 to 90%.

1 Claim, 4 Drawing Figures

ACRYLONITRILE CONTAINING COPOLYMERS BLENDS AND PROCESS FOR THEIR PREPARATION

This invention relates to copolymers of acrylonitrile, vinyl acetate and styrene containing a high proprotion of acrylonitrile (more than 50% by weight) and to a special continuous emulsion polymerisation process for their preparation.

Acrylonitrile/vinyl acetate/styrene copolymers are mainly known from U.S. Pat. No. 2,757,165. However, the copolymers described there contain only 20 to 35% by weight of acrylonitrile built into the molecule as opposed to 50% by weight of styrene. According to column 11, lines 50 to 58 of the said patent specification, transparent terpolymers cannot be obtained by the said process at higher acrylonitrile contents than those indicated there. Moreover, the predominant comonomer has a major influence on the development of the physical and chemical properties of the terpolymer so that chemically resistant products cannot be obtained because the styrene content is too high.

There is increasing interest in thermoplastically deformable resin compounds containing a high proportion of copolymerised acrylonitrile. These compounds are suitable for the manufacture of transparent products which, due to their excellent barrier action against gases such as carbon dioxide and oxygen and against volatile aromatic compounds, have an important field of application, e.g. as foils or containers in the packaging industry. The production of such copolymers having acrylonitrile contents of from 50 to 85% by weight is predominantly carried out by polymerisation in aqueous emulsion by discontinuous methods.

For commercial polymerisation processes, it is advantageous to replace the discontinuous process by more rational continuous processes. This applies particularly to copolymerisations, in which the comonomers differ widely from each other in their reactivity. In such cases, the continuous process enables the monomers and other starting components to be adjusted to an accurately defined equilibrium concentration, which is an essential precondition for obtaining copolymers having a constant composition and molecular weight distribution. In a noncontinuous process, such constancy can be obtained only by introducing relatively complicated measures for dosing the reactants.

However, continuous emulsion polymerisation gives rise to additional problems not found in other continuous polymerisation processes. In order to obtain high quality polymers, it is necessary not only to be able to control the kinetics of the polymerisation process as such, but also to find reaction conditions under which the formation and growth of the latex particles can be advantageously adjusted to each other.

In continuous emulsion polymerisation, the formation of particles and the growth of particles are not in equilibrium with each other, leaving aside rare exceptions, but are subject to a periodic change which depends on the length of residence time of the components in the reaction apparatus, as has been described, for example, with reference to the continuous emulsion polymerisation of vinyl chloride and of styrene in Journal of Applied Polymer Science Vol. 18 (1974), page 2379 and in "Die Makromolekulare Chemie" 175 (1974), page 563.

In the case of continuous emulsion polymerisation of acrylonitrile/vinyl acetate/styrene in back mixing stirrer vessels, it was found that a conversion range of 70 to 85% and a residence time in the reactor of 1 to 5 hours, the diameters of the latex particles formed in the reaction increased excessively in the course of polymerisation while the range of diameters of relatively narrow.

Figure 1:
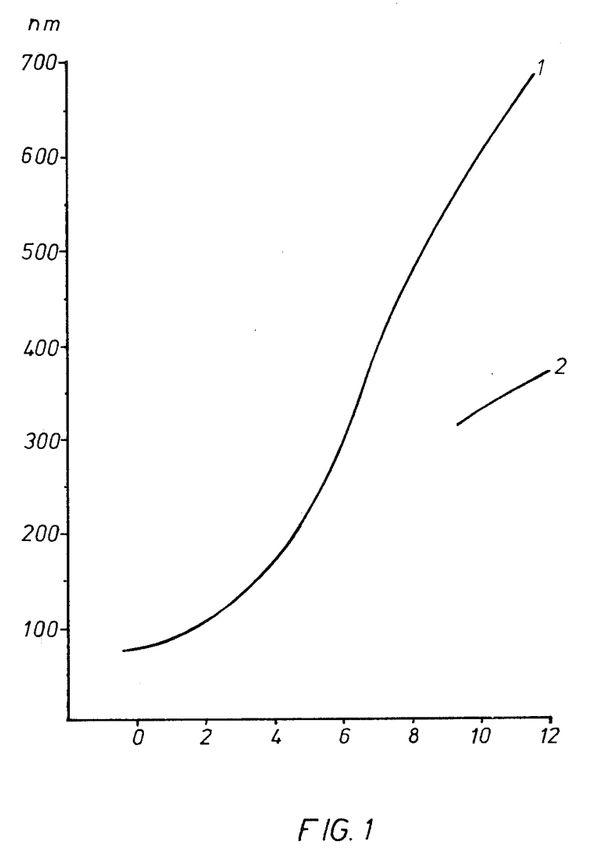

The growth of the particles obtained in the continuous polymerisation process described in Comparison Example 1 is represented by curves 1 and 2 in FIG. 1. The time in hours of the continuous polymerisation process is plotted along the abscissa, the starting period having already been completed at zero time. Starting from time zero, reaction material is continuously discharged. The diameters of the latex particles are plotted in Nanometers (nm) on the ordinate.

Since the gross polymerisation velocity remains constant during the continuous reaction, the finding represented by curve 1 must be due to a drastic reduction in the number of particles. It is only after the ninth hour of the continuous process that the growth of a second generation of particles is observed, as can be seen from curve 2 of FIG. 1.

Figure 2:
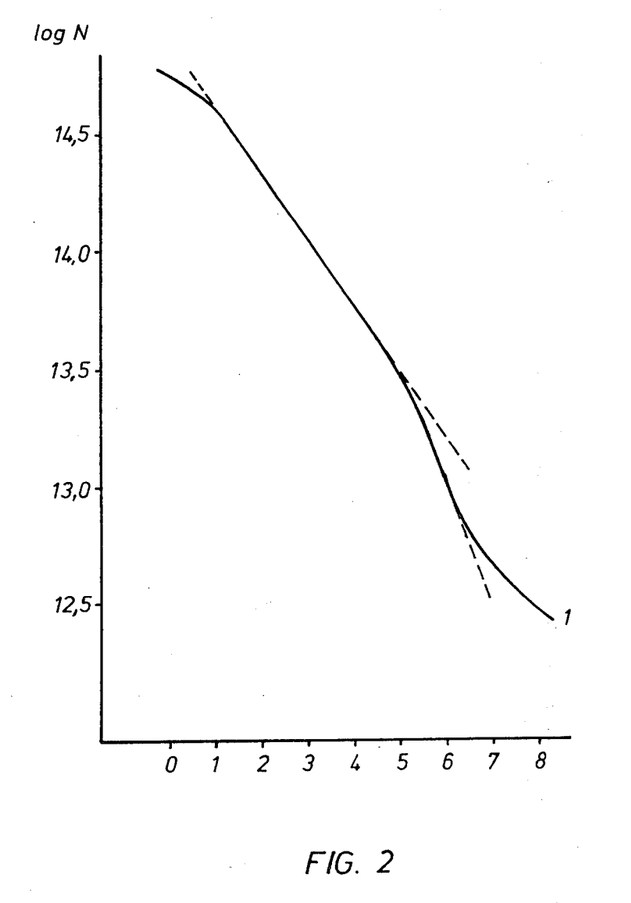

In FIG. 2, the time of the continuous polymerisation process is plotted in hours on the abscissa as in FIG. 1 and log N is plotted on the ordinate, where N is the number of particles per cc (1/cc). It is obvious from the shape of the curve in FIG. 2 that the average number of particles initially decreases according to a first order law, that is to say no new particles are formed and the reduction in the number of particles is determined only by the rate of discharge of the latches in the continuous process, this rate being in turn determined by the residence time of the reactants. These relationships apply strictly over a period of 5 hours, corresponding to about three times the residence time of the reactants. Thereafter, the rate of reduction of the number of particles deviates from a first order law and becomes more rapid, this being due to increased agglomeration of the relatively large particles. It is only after a period equivalent to four residence times that the rate of growth of the particles is seen to slow down, this being due to the onset of the formation of new particles. Starting from the ninth hour of the continuous process, it can be seen that a second generation of particles of smaller diameters begins to develop. Thereafter, new generations of particles develop at a periodicity of about 3 to 4 cycles of residence times. Superimposition of the various generations results in a wide distribution of sizes of latex paticles which a high average particle size.

The consequence of this behaviour is that, in the course of continuous polymerisation, batches of latex particles differing from each other in the size of the particles and in the number of particles in the batch are formed. Moreover, these batches also differ from each other in the degree of saturation with emulsifier. This deleteriously affects the uniformity of the quality of the latex.

Latices with large average particle diameters have a greater tendency to coagulation and are therefore less stable in storage. They contain considerable quantities of sediment within a short time.

Latices consisting of coarse particles are more sensitive to temperature so that when attempts are made to remove monomer residues, for example by steam degasification, or to precipitate the latex, it is difficult to adjust constant, technically acceptable conditions.

Latex batches which are supersaturated with emulsifier tend to foam up vigorously when subjected to these working up processes.

Due to the fluctuations described above, the thermal stability of the polymers obtained at different times of the process also varies. This manifests itself in more or less pronounced discoloration of the products obtained from them by thermoplastic shaping.

It is already known that the formation of particles in the emulsion polymerisation process can be influenced by feeding in a seed latex. In batchwise and semi-batchwise processes, the presence of such a seed latex renders the critical phase of particle formation, which is often decisive for the subsequent stages of polymerisation, more easily controllable. For obtaining equal particle numbers in continuous emulsion polymerisation, a so-called seeder should be arranged in front of the actual polymerisation apparatus in the same way as in discontinuous processes. The particle formation phase should then be carried out separately in this seeder under conditions avoiding back mixing. This method can be employed for polymerising only one monomer component and in that case leads to the desired result of uniformity of particle formation. It cannot be employed for multicomponent systems if two or more monomers differing substantially in their reactivity are used for copolymerisation. Since back mixing should be prevented during the prepolymerisation stage, the reactive comonomer is built into the polymer chain to a greater extent during the initial phase, as it passes through the preliminary reactor, while in the final stage the quantity incorporated by polymerisation is substantially less due to the reduction in concentration of the more active comonomer. This means that copolymers produced in a seeder are chemically very non-uniform.

These conditions are particularly marked in the monomer combination acrylonitrile/styrene in which styrene is the more active partner, as described by way of example in German Offenlegungsschrift No. 1,745,028. The same conditions apply to the pair of monomers acrylonitrile/vinyl acetate. In this case, acrylonitrile functions as the more active comonomer in the copolymerisation reaction. The monomer combination of acrylonitrile/vinyl acetate/styrene yields unusable products when a seeder is used for producing a seed emulsion in front of the main polymerisation apparatus.

In the continuous polymerisation on process described in Comparison Example 2, the previously dispersed monomer mixture of acrylonitrile/vinyl acetate/styrene (ratio by weight 60:30:10) was passed through a tube reactor (laminar plug flow) and prepolymerised to a degree of conversion of 27.5% before it was polymerised to a final degree of conversion of 82% in the continuous, back mixing stirrer reactor attached to the tube reactor. The thermoplastically shaped articles produced from such a polymer were inhomogeneous and completely opaque. The lack of transparency must be attributed to the incompatibility between the copolymers obtained in the two stages.

It is an object of the present invention to provide a simple, problem-free and accurately reproducible continuous emulsion polymerisation process for producing acrylonitrile/vinyl acetate/styrene copolymers containing a high proportion of acrylonitrile ($\geq$ 50% by weight), in which process stable and uniform copolymer latices can be formed which have small particles, ranging from about 150 to 250 nm, and in which the distribution of particle sizes is narrow and remains constant with time.

The process should also provide the possibility of obtaining copolymer latices having high solids contents. Moreover, the operations required for converting the latices into polymer powders, i.e. removal of the residual monomers and the various precipitation and filtration operations as well as washing and drying of the copolymer powder, should be able to be carried out under constant operating conditions.

Furthermore, and this is a very important point, when the copolymer powders obtained are thermoplastically processed to produce shaped articles by the usual methods such as extrusion, injection moulding or blow moulding, they should as far as possible undergo no discoloration and result in highly transparent products.

The problem has been solved by means of a process in which, in a first stage, the monomers, acrylonitrile, vinyl acetate and styrene, are continuously copolymerised in certain proportions in the presence of the necessary polymerisation aids and under special operating conditions in a tube reactor in which comparatively little back mixing occurs (plug flow = laminar flow = non-stationary state) so that a seed latex having a specified, small particle size with a narrow particle size distribution and definite chemical composition and broad chemical distribution of the copolymer is obtained; the reaction mixture is then cooled, if necessary, in order to prevent further polymerisation as far as possible and continuously transferred into a stirrer vessel while at the same time a stream of monomers consisting of acrylonitrile, vinyl acetate and styrene also having a specified but different percentage composition of monomers than in stage 1 is also fed into this stirrer vessel, and in this, second stage of the process, polymerisation is carried out at specified temperatures and with specified residence times under stationary conditions, i.e. with back mixing, up to a total conversion (stages A + B) of 70 to 90%.

The present invention thus provides a continuous process for the preparation of copolymer latices having an average particle diameter of 150 to 250 nm and a particle size distribution which remains constant with time, from thermoplastic acrylonitrile/vinyl acetate/styrene and copolymers containing 50 to 85% by weight, preferably 55 to 70% by weight of acrylonitrile incorporated by polymerisation, which latices can be processed into practically colourless, transparent shaped articles, by copolymerisation in aqueous emulsion in the presence of the usual auxiliary agents for polymerisation, characterised in that (A) in a first stage of the process,
50 to 80 parts by weight of a mixture of
44 to 70% by weight of acrylonitrile,
29 to 50% by weight of vinyl acetate,
1 to 6% by weight of styrene and, based on the quantity of monomers,
0.1 to 1.0% by weight of a $C_8$-$C_{12}$ alkylmercaptan,
are continuously mixed in the mixing apparatus with streams of substances fed in at the same time but separately and consisting, on the one hand, of water, the oxidising component of a redox system and other usual auxiliary agents for polymerisation and, on the other hand, water, the reducing component of the redox system and other conventional auxiliary agents for polymerisation, this mixing process resulting in an aqueous dispersion having a concentration, based on the monomers, of 10 to 40% by weight; the resulting dispersion is conducted under non-stationary conditions (laminar plug flow) at 50° to 90° C. through a tube reactor with residence times of from 1 to 10 minutes in which it is copolymerised to a degree of conversion of 10 to 40%, and thereafter (B) in a second stage of the process, the seed latex obtained as described under (A) and at the same time but separately therefrom 20 to 50 parts by weight of a mixture of 50 to 80% by weight of acrylonitrile,
10 to 25% by weight of vinyl acetate,
10 to 25% by weight of styrene and, based on the monomers,
0.1 to 1.0% by weight of a $C_8$–$C_{12}$ alkyl mercaptan are continuously fed into a stirrer vessel and the mixture is copolymerised at 50° to 80° C. under stationary conditions (with back-mixing) and with residence times of 1 to 4 hours to a total degree of conversion of 70 to 90% (Stages A + B).

The proportion by weight of water to monomer in the mixing apparatus is preferably adjusted to a value between 80:20 and 60:40, which corresponds to 20 to 40% by weight dispersions, based on the monomers.

So long as the process steps claimed according to the invention and described in the text are observed, the process according to the invention is not limited to any special apparatus. For example, it may be carried out in an apparatus of the kind indicated schematically in FIG. 3. In this apparatus, the stream 1 containing water, pH regulator, heavy metal complex-forming compound and oxidising component of the redox system, stream 2 containing water, emulsifier and the reducing component of the redox system and the monomer stream 3 of acrylonitrile, vinyl acetate, styrene and regulator are fed into the mixing apparatus 9 via dosing pumps 5, 6 and 7, respectively. The resulting emulsion (stream 10) is delivered by a pump 11 to the tube reactor 12 which operates under non-stationary conditions. After passing through the cooling apparatus 13, the polymer emulsion (seed emulsion) produced in the tube reactor flows as a stream 14 into the stirrer vessel 15 which operates under non-stationary conditions. At the same time, the monomer stream 4 of acrylonitrile, vinyl acetate, styrene and regulator which has a different percentage composition from the monomer stream 3 is fed into the stirrer vessel 15 by way of pump 8. The polymer latex is removed from the reactor as stream 16.

The auxiliary agents for polymerisation may include emulsifiers, radical initiators, pH regulators, heavy metal complex-forming compounds and regulators.

Figure 3:
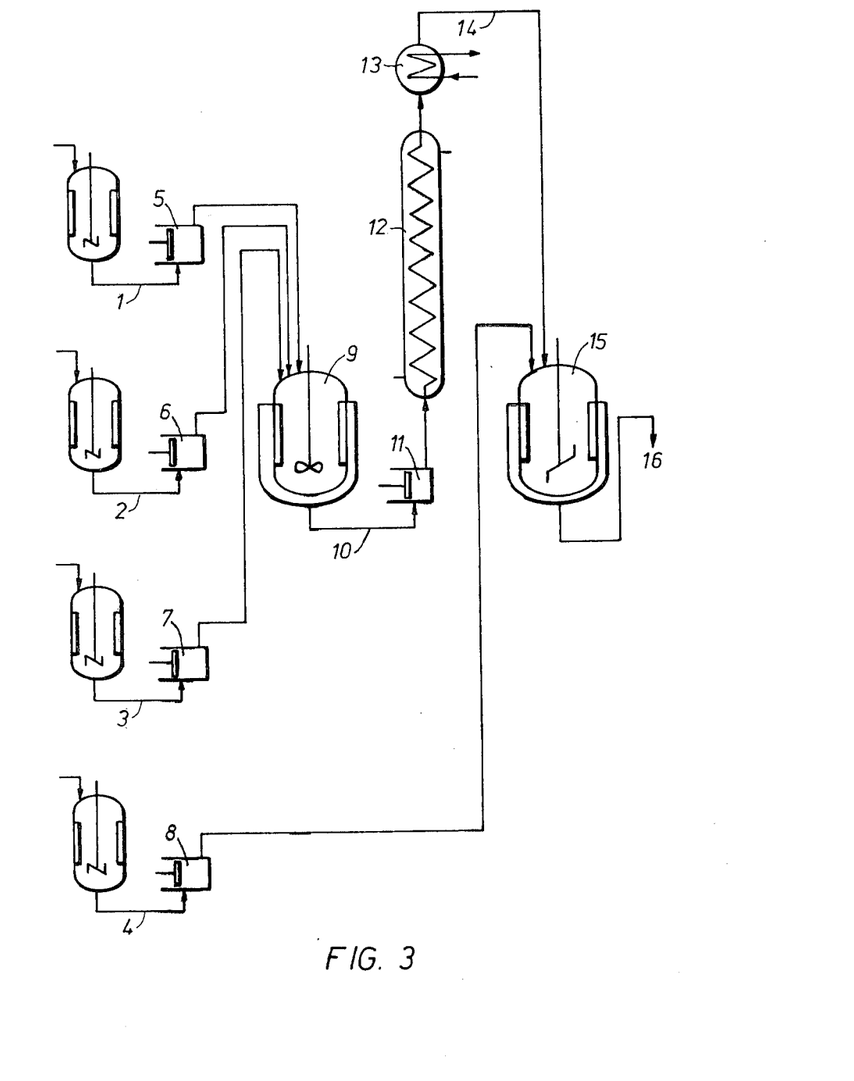

Anionically active emulsifiers are suitable, and these may be used in combination with non ionic emulsifiers. Particularly good results are obtained with sodium lauryl sulphate as well as with the usual commercial alkyl phenol polyglycol ethers containing sulphate or phosphonate groups. It has also been found suitable to use a combination of the above mentioned anionic emulsifiers. If sulphated alkylphenolpolyglycol ethers are added, for example, it is possible to prepare an exceptionally stable, finely divided dispersion of monomers in the mixing apparatus 9. This is an essential precondition for polymerisation at a constant conversion rate in the tube reactor. The emulsifiers are used in quantities of from 0.5 to 5.0% by weight, based on the quantity of monomer mixture which is to be converted.

The radical starters used for emulsion polymerisation are preferably water-soluble redox catalyst systems, in particular with the following combinations of oxidising and reducing agents: alkali metal or ammonium persulphates/alkali metal pyrosulphites; $H_2O_2$/hydroxymethane sulphinate or tertiary butyl hydroperoxide/hydroxymethane sulphinate, used in concentrations of from 0.5 to 3.5% by weight, based on the quantity of monomer to be polymerised. The ratio by weight of oxidising to reducing component in the redox system may vary from 1:1 to 1:6.

pH Regulators include acids or buffer systems which enable the reaction to be carried out at a constant pH. Continuous polymerisation in the form provided according to the invention is carried out preferably at a pH range of from 1.5 to 5.0, preferably at pH 2 to 4. Acids used for this purpose may be, for example, sulphuric acid or phosphoric acid while primary/secondary alkali metal phosphates may be used as buffer systems.

To counteract uncontrolled decomposition of the initiator system, which, as is well known, is catalysed by the presence of traces of heavy metals, it is advisable to add small concentrations (10 to 100 ppm, based on the monomer) of heavy metal complex formers to the reaction mixture, for example, sodium hexametaphosphate or the tetrasodium salt of ethylene diaminotetracetic acid.

When carrying out emulsion polymerisations, it is in most cases necessary to adjust the molecular weights by the addition of regulators. For the process according to the invention, it has been found suitable to use regulators which are soluble in monomers. The most important among these are $C_8$–$C_{18}$ alkylmercaptans, for example n-octylmercaptan or dodecylmercaptan. They are added to the monomer streams in quantities of 0.1 to 1.0% by weight, based on the monomers.

As a deviation from the flow chart shown in FIG. 3, the auxiliary agent for polymerisation indicated above may be fed into the mixing apparatus 9 in more than two streams. For example, the oxidising and the reducing components of the redox system as well as each additional component of the polymerisation auxiliary agent fed into the mixing apparatus may be supplied as separate streams of substance. Mixing of the monomer stream with the streams of polymerisation auxiliary substances in the mixing apparatus should be carried out at sufficiently low temperatures to prevent the onset of polymerisation, preferably at temperatures of 0° to 10° C.

Copolymerisation of the first stage of the process in a tube reactor is carried out at 50° to 90° C., preferably 60° to 70° C. If prepolymerisation in the tube reactor is carried out at the upper limit of the given temperature range of 50° to 90° C., it is advisable, in order to prevent the formation of bubbles along the tube, to instal an overflow valve at the outlet end of the reactor so that a sufficient pressure can build up inside the tube. The residence times of the reactants are from 1 to 10 minutes, preferably 3 to 7 minutes, and the degrees of conversion are 10 to 40%, preferably 15 to 35%. The solids contents of the latices accordingly amount to 1 to 17% by weight, preferably 3 to 15%. The degree of conversion of the reaction may be predetermined both by the temperature employed and by suitable variation of the residence times. The residence time may be adjusted, for example, by adjusting the length of the tube. Alternatively, with a tube of constant length, the residence time can be adjusted by varying the velocity of flow through the tube.

Polymerisation in the first stage in the tube reactors is carried out under no-stationary conditions. The polymerisation components pass through the reaction tube as a laminar flow in the form of a plug or in discrete zones, and back mixing of the polymerisation components with a stream of freshly introduced monomers must be avoided as far as possible. This is achieved by a narrow range of residence times in the reaction tube.

The apparatus used for polymerisation under nonstationary conditions are tubular reactors or reaction screws, for example those described in German patent specification No. 1,202,251. The stirrers of the tubular reactors must be designed so that a plug flow is produced inside the tube. This can be achieved, for example, by using grid stirrers or scrapers contacting the wall of the tube. Inserts rigidly fixed in the tubes ensure that back mixing cannot occur. The relationships of residence times in the reaction tube or screw should correspond to those of a cascade of vessels consisting of at least 100 vessels of equal size connected in series.

As will be seen in the examples, polymerisation under non-stationary conditions is preferably carried out in a tube having a ratio of length to diameter of between 1000:1 and 4000:1, in particular between 2000:1 and 3000:1. When completely flooded, such tube reactors are virtually ideal flow tubes.

Polymerisation in the reaction tube under non-stationary conditions results in latex particle sizes of from 30 to 100 nm. The terpolymers obtained from these latices by coagulation can be split up into polymer fractions differing distinctly in their chemical composition, i.e. polymers covering a wide chemical range of incorporated monomer units are obtained. The distribution of monomers in the polymers can be determined analytically by fractional analyses. A more accurate, quantitative determination of the monomer distribution can be obtained by means of the Alfrey and Goldfinger equation, the accuracy of which has been confirmed in numerous cases (see U.S. Pat. No. 3,879,357).

The latex produced in the tube reactor is also referred to as seed latex in this application. After passing through a cooling device (13), it is conducted into the continuously operating stirrer vessel 15 which is under stationary conditions. In this reactor 15, the seed latex is combined with the monomer mixture (stream 4) which is pumped in at the same time. In this reactor 15, the resulting mixture is polymerised to a total conversion (stages A + B) of 70 to 90% at temperatures of from 50° to 80° C. and with residence times of 1 to 4 hours. Adjustment of the residence time in the continuous stirrer vessel is carried out by fixing the overflow level or by suitably regulating the rates of inflow of streams 4 and 14. In cooling zone 13, the seed latex is cooled to temperatures of between 10° and 50° C, preferably 20° to 40° C., in order to prevent any further polymerisation in the seed latex. Cooling may be omitted if the tube reactor 12 opens directly into the stirrer vessel 15.

The term "under stationary conditions" used in this application means that the concentrations of all the reactants and the compositions of the products formed in the reactions remain virtually constant over the period of polymerisation. In addition, the reaction parameters such as residual monomer composition, temperature, concentration of initiator and conversion rates remain approximately constant with time. The polymer formed in the reaction and the residual monomers are discharged from the reaction chamber at the same rate of flow as that at which the monomers used as starting materials are fed in.

When polymerisation is carried out under stationary conditions, the differential and integral compositions of the polymers are equal and the relationship between the polymer compositions and the composition of residual monomers depends on the conversion rate. The differential composition is the composition of that polymer which is formed at a given point in time whereas the integral composition is the overall composition of that polymer which is formed within a given period of time.

Figure 4:
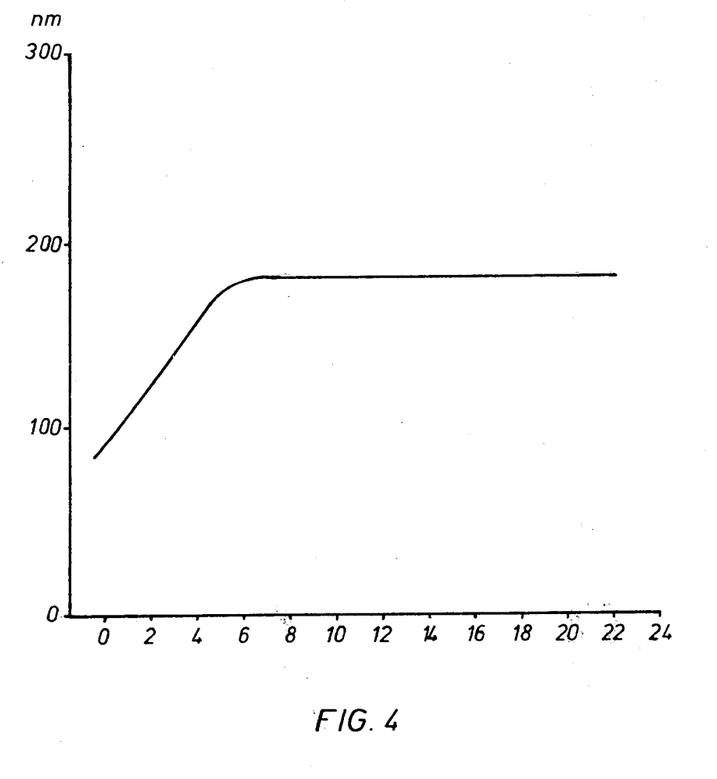

After removal of the residual monomers in the usual degasification apparatus, the stable latices obtained as end product according to the invention have solids contents of from 15 to 45% by weight. They are distinguished by a narrow range of particle sizes within a low level of particle sizes of from 150 to 250 nm. According to Example 1 of the present application, the level of particle sizes settles to a constant value of about 210 nm after 7 to 8 hours of continuous operation. According to Example 2, the level settles at 180 nm after 5 to 6 hours. FIG. 4 illustrates the result obtained in Example 2. As in FIG. 1, the graph in FIG. 4 shows the operating time in hours on the abscissa and the particle size in nm on the ordinate.

It must be regarded as surprising that the acrylonitrile/vinyl acetate/styrene copolymer latices which have been concentrated by the process according to the invention and which remain stable even during removal of the residual monomers and do not tend to foam, can be obtained at a low level of particle sizes and within a narrow range of particle sizes which remains constant with time, particularly in view of the fact that the amount of acrylonitrile built into the copolymer is more than 50% by weight. In known copolymer latices of acrylonitrile, vinyl acetate and styrene, the maximum amount of acrylonitrile in the copolymer is 35% by weight (see U.S. Pat. No. 2,757,165), and these copolymer latices tend to become unstable as the proportion of acrylonitrile built into the copolymer increases, that is to say they tend to sediment and to undergo uncontrolled coagulation in the process of concentration (see Comparison Experiment 1).

The acrylonitrile/vinyl acetate/styrene copolymers can be precipitated at elevated temperatures of 50° to 80° C. from the latices obtained according to the invention by the addition of these latices of aqueous electrolyte solutions such as sodium chloride, magnesium chloride or aluminum sulphate or concentrated acids such as acetic acid, and the precipitated copolymers can easily be isolated by filtration at 50° to 90° C. After is has been washed with water, the copolymer now free from emulsifier and electrolyte is dried at 50° to 90° C. until the residual moisture content has been reduced to less than 0.5% by weight, and preferably less than 0.3% by weight.

By fractional analysis it was found that the copolymers isolated from the latices contained no graft components but consisted of a mixture of the terpolymer prepared under non-stationary conditions in the tube reactor and the terpolymer prepared under stationary conditions in the stirrer vessel. The two terpolymers are clearly distinguished from each other by the distribution of monomer units built into them (constitutional non-uniformity).

As already indicated above, the terpolymers obtained under non-stationary polymerisation conditions in the tube reactor are non-uniform, i.e. they have a wide distribution of monomer units built into them, whereas the terpolymers obtained under stationary polymerisation conditions in the stirrer vessel are uniform polymers with a narrow distribution of monomer units built into them. For methods of calculation and analytical determination of the distribution, see U.S. Pat. No. 3,879,357.

The constitutional non-uniformity is completely defined by the three properties of average composition, distribution range and skewness of distribution and is accordingly characterised by the following three statistical parameters:

(1) Weight average of composition $\overline{E}w$, 2) weight average of standard deviation $\epsilon\,w$, and 3) weight average of skewness of distribution $\Omega\,w$. All three parameters can be obtained directly by known analytical methods or calculated from data (copolymerisation parameter, degree of conversion). For information on this, see "Makromoleküle" by Hans Georg Elias, publishers Hüthig and Wepf. Basel-Heidelberg (1971) pages 48 to 55.

It has now surprisingly been found that mixtures of terpolymers isolated from latices prepared according to the invention can be processed into highly transparent shaped articles without any significant discolouration by the usual methods of shaping thermoplastic materials such as extrusion, injection moulding and blowing moulding.

The present invention therefore also provides mixtures of acrylonitrile/vinyl acetate/styrene terpolymers composed of (A) 10 to 30% by weight of a terpolymer of copolymerised units of acrylonitrile, vinyl acetate and styrene having weight averages of the composition $\overline{E}w$, standard deviation $\delta\,w$ and skewness of distribution $\Omega\,w$ as indicated below:

|  | $\overline{E}w$ | $\delta w$ | $\Omega w$ |
|---|---|---|---|
| Acrylonitrile | 50–85% by wt. | 6–20% by wt. | −0.8 to 0.5 |
| Vinyl acetate | 10–26% by wt. | 3–10% by wt. | −0.5 to 0.4 |
| Styrene | 5–24% by wt. | 5–30% by wt. | −0.5 to 0.8 | and a K-value of 50 to 70 measured at 25° C. in 0.5% by weight dimethylformamide solution, and (B) 70 to 90% by weight of a terpolymer of copolymerised units of acrylonitrile, vinyl acetate and styrene having weight averages of compositions $\overline{E}'w$, standard deviation $\delta'w$, and skewness of distribution $\Omega'w$ as indicated below:

|  | $\overline{E}'w$ | $\delta'w$ | $\Omega'w$ |
|---|---|---|---|
| Acrylonitrile | 50–85% by wt. | 0–2.0% by wt. | 0 |
| Vinyl acetate | 6–30% by wt. | 0–1.0% by wt. | 0 |
| Styrene | 9–20% by wt. | 0–1.0% by wt. | 0 | and a K-value of 55 to 70 measured at 25° C. in 0.5% by weight dimethylformamide solution, provided that the difference between the styrene contents $\overline{E}w$ and $\overline{E}'w$ does not exceed 4% by weight and the K-values of the terpolymers A and B do not differ from each other by more than 10.

Mixtures of terpolymers A + B were found to consist of a total of copolymerised units of from 50 to 85% by weight of acrylonitrile, 7 to 29% by weight of vinyl acetate and 8 to 21% by weight of styrene. The K-values were 50 to 70.

Acrylonitrile/vinyl acetate/styrene copolymer mixtures having the specific structure in accordance with the process can easily be worked up into transparent shaped articles by the usual methods of injection moulding, extrusion and blow moulding. They are clearly distinguished by their improved thermal stability. Compared with copolymers produced by a continuous process without a preliminary reaction stage and without separation of the monomer streams, the copolymers according to the invention have a substantially reduced tendency to discolour under thermal and mechanical stresses.

The parts and percentages of the various components given in the following Examples refer to weight unless otherwise indicated.

The intrinsic viscosity $[\eta]$ given in the description and Examples were determined in dimethylformamide at 25° C. and are given in dl/g. For a definition of the intrinsic viscosity number, see H. - G. Elias: Makromoleküle, publishers Hüthig and Wepf-Verlag Basle, page 265.

The given K-values of the polymers were determined at 25° C. in 0.5% dimethylformamide solution by the Fikentscher method, Cellulosechemie 15, (1932), page 58.

The particle sizes of the latices were determined by light scattering measurements. The average particle diameters are obtained from the relationship between the angle and the light scattering and are calculated on the assumption that the particles are spherical.

COMPARISON EXAMPLE 1

Preparation of an acrylonitrile/vinyl acetate/stryene copolymer latex by continuous emulsion polymerisation in a back mixing stirrer vessel without tube reactor. The following solutions I, II and III were used:

| Solution I | |
|---|---|
| Deionised water | 1000 parts |
| Potassium persulphate | 1.55 parts |
| Sulphuric acid (normal) | 34 parts |
| Tetrasodium salt of ethylenediamino-tetracetic acid (0.2% by weight in $H_2O$) | 5 parts |
| Solution II | |
| Deionised water | 1000 parts |
| Sodium pyrosulphite | 9.3 parts |
| Sodium lauryl sulphate (30% by weight in $H_2O$) | 34 parts |
| Solution III | |
| Acrylonitrile | 600 parts |
| Vinyl acetate | 300 parts |
| Styrene | 100 parts |
| n-octylmercaptan | 3.5 parts |

Solutions I to III are delivered simultaneously in the following proportions, with stirring, into a reaction vessel (6 l) adjusted to 53° C.:

Solution I : 100 parts per hour
Solution II : 100 parts per hour
Solution III : 50 parts per hour After 1.5 hours, by which time the reaction volume is constant, an overflow is opened so that emulsion is continuously discharged in a quantity corresponding to the rate of inflow of Solutions I to III (residence time:1.5 hours).

When the degree of conversion reaches 75%, an emulsion having a solids content of 16% by weight is obtained after removal of the residual monomers in a degasification apparatus. A polymer having the following properties is isolated from this emulsion: Composition of copolymer: Copolymerised units of 64% by weight of acrylonitrile, 22% by weight of vinyl acetate and 14% by weight of styrene.

K-value: 61.0 $[\eta]$ = 0.8,

Dye number $\Delta E$ = 11.5$^+$).

To determine the dye number, a sample of polymer in kneaded in a Brabender plastograph (temperature 180°

C., rotation 50 revs/min) for 20 minutes. The sample treated in this way is made up into a 5% by weight solution in dimethylformamide. The colour difference $\Delta E$ between this solution and pure dimethylformamide is measured in 5 ml cuvettes, using a Hardy spectral photometer in the wavelength range of 380 to 700 nm.

As can be seen from FIG. 1, graph 1, the diameter of the latex particles increases very rapidly with increasing polymerisation time. FIG. 2 clearly shows the drastic reduction in the number of particles with time. The consequences of this behaviour on the quality of the latex obtained have already been explained in the description given reference to FIGS. 1 and 2.

When the 16% latex obtained according to Comparison Example 1 was concentrated by removal of water by distillation, no latices with solid contents above 20% could be obtained. Complete coagulation occurred during distillation.

COMPARISON EXAMPLE 2

Preparation of an acrylonitrile/vinyl acetate/styrene copolymer latex by continuous emulsion polymerisation in a stirrer vessel with tube reactor arranged upstream thereof, but without separation of the monomer stream. The following solutions I, II and III were used:

| Solution I | |
|---|---|
| Deionised water | 1000 parts |
| Potassium persulphate | 2.1 parts |
| Sulphuric acid (normal) | 51.7 parts |
| Tetrasodium salt of ethylenediamino-tetracetic acid (0.2% in H$_2$O) | 5.0 parts |
| Solution II | |
| Deionised water | 1000 parts |
| Sodium pyrosulphite | 12.5 parts |
| Commercial emulsifier$^{+)}$ (50% solution in water) | 50 parts |
| Solution III | |
| Acrylonitrile | 600 parts |
| Vinyl acetate | 300 parts |
| Styrene | 100 parts |
| n-octylmercaptan | 4.15 parts |

$^{+)}$Sulphated alkylphenol polyglycol ether (Trade product Hostalpol BV® manufactured by Hoechst)

Solutions I, II and II were transferred in the following proportions:
  Solution I : 150 parts per hour
  Solution II : 150 parts per hour
  Solution III : 100 parts per hour
to a stirrer vessel kept at 0° C. and were dispersed therein.

The resulting dispersion was conducted by means of a dosing pump through a tube reactor (ratio of length to diameter 2500:1) which was kept at 60° C., and the dispersion was polymerised therein under non-stationary conditions (laminar plug flow).
  Dosing rate: 400 parts per hour
  Residence time in tube reactor: 3.7 minutes
  Conversion in tube reactor: 22.4%

The 6.5% seed emulsion leaving the tube reactor was cooled and then conducted with stirring into a 6 liter stirrer vessel which was kept at 53° C., and the emulsion was polymerised therein under stationary conditions (back mixing). After 1.5 hours, when the reaction volume was already constant, an overflow was opened to continuously discharge emulsion (28%) at the rate corresponding to the rate of inflow of the components (residence time in stirrer vessel 1.5 hours).

When the total conversion obtained in both stages is 82%, a 22% emulsion is obtained after removal of the residual monomers in a degasification apparatus. When this emulsion is worked up as in Example 1, a polymer having the following properties is isolated:
  Composition of copolymer:
  Copolymerised units of
  63.4% by weight of acrylonitrile,
  21.2% by weight of vinyl acetate, and
  15.4% by weight of styrene.
  K-value: 63.5; $[\eta] = 0.86$.

Articles obtained from such a polymer by thermoplastic shaping are inhomogeneous and completely cloudy.

This comparison Example shows that the measures claimed according to the invention, in particular polymerisation under non-stationary conditions in the tube reactor followed by polymerisation under stationary conditions in the stirrer vessel, do not lead to the desired end product if the monomer streams are not separated.

The chemical distribution of the monomer units (constitutional non-uniformity) built into the polymers produced in the tube reactor and stirrer vessel were determined analytically and by calculation. The following results were obtained:

| | Ew (% by wt.) | $\zeta$ w (% by wt.) | $\Omega$ w |
|---|---|---|---|
| Tube reactor | | | |
| Acrylonitrile | 50.9 | 6.6 | 0.348 |
| Vinyl acetate | 6.3 | 2.4 | 0.373 |
| Styrene | 42.8 | 9.0 | 0.347 |
| Stirrer vessel | | | |
| Acrylonitrile | 68.1 | 1.2 | 0 |
| Vinyl acetate | 26.8 | 1.0 | 0 |
| Styrene | 5.1 | 0.5 | 0 |

The polymer produced in the tube reactors has a K-value of 49.5 and a viscosity number $[\eta]$ of 0.58 whereas the polymer obtained in the stirrer vessel has a K-value of 67.5 ($[\eta] = 0.94$).

The products obtained by the procedure described above no longer fall within the range according to the invention as regards the polymer compositions obtained in the two stages. The lack of transparency is due to the great difference in the styrene contents ($> 4.0\%$ by weight). It is also found that the K-values differ by more than 10.0.

EXAMPLE 1

Preparation of an acrylonitrile/vinyl acetate/styrene copolymer by the process according to the invention. The following solutions I, II and III and IV were used:

| Solution I | |
|---|---|
| Deionised water | 1000 parts |
| Potassium persulphate | 1.73 parts |
| Sulphuric acid (normal) | 31 parts |
| Tetrasodium salt of ethylenediamino-tetracetic acid (0.2% by weight H$_2$O) | 5 parts |
| Solution II | |
| Deionised water | 1000 parts |
| Sodium pyrosulphite | 10.24 parts |
| Sodium lauryl sulphate (30% by weight in H$_2$O) | 18.8 parts |
| Commercial emulsifier as in Comparison Example 2 (50% by weight in H$_2$O) | 13.65 parts |
| Solution III | |
| Acrylonitrile | 575 parts |
| Vinyl acetate | 400 parts |
| Styrene | 25 parts |
| n-octylmercaptan | 3.8 parts |
| Solution IV | |
| Acrylonitrile | 650 parts |
| Vinyl acetate | 208 parts |
| Styrene | 142 parts |

-continued

| n-octylmercaptan | 3.2 parts |

Solutions I, II and III are transferred in the following proportions:
Solution I : 80 parts per hour
Solution II : 80 parts per hour
Solution III : 27 parts per hour
to a stirrer-equipped vessel tempered at 0° C. and are vigorously mixed therein.

The resulting dispersion is conducted through a tube reactor tempered at 60° C. (ratio of length to diameter 3000:1) by means of a dosing pump and polymerised in this reactor under non-stationary conditions.

| Dosing rate: | 187 parts per hour |
| Residence time in tube reactor | 4.0 minutes |
| Conversion in tube reactor | 17.0%. |

The 3.5% seed emulsion leaving the tube reactor is cooled and then transferred with stirring to a 10 l stirrer vessel which is tempered at 53° C. In this vessel, it is combined with the stream of solution IV which is fed in at the same time at the rate of 18 parts per hour. After a polymerisation time of 75 minutes, at which time the reaction volume is constant, an overflow is opened for continuous discharge of an 18.0% emulsion at the same rate that the components are fed in (residence time in stirrer vessel 75 minutes). After a continuous operating time of 7 to 8 hours, the particle sizes remained constant at a level of about 210 nm.

When the total conversion over both stages is 79%, a polymer having the following properties is isolated after precipitation with aqueous aluminum sulphate solution, washing with water until the polymer is free from emulsifier and electrolyte and drying of the polymer at 60° C. until the residual moisture content is reduced to 0.4%:
Overall composition: Copolymerised units of
67.5% by weight of acrylonitrile,
23.4% by weight of vinyl acetate, and
11.0% by weight of styrene.
K-value: 61.5; $[\eta] = 0.85$
Dye number: $\Delta E = 8.5$ The articles obtained by thermoplastic shaping are transparent.

The polymer produced in tube reactor stage A consists of copolymerised units of
71.0% by weight of acrylonitrile,
15.2% by weight of vinyl acetate, and
13.8% by weight of styrene.
K-value: 60.5 $[\eta] = 0.8$ The polymer obtained in stirrer vessel B was found to have the following composition: Copolymerised units of
65.3% by weight of acrylonitrile,
24.5% by weight of vinyl acetate, and
10.2% by weight of stryene.
K-value: 61.7; $[\eta] = 0.86$.

For the polymers produced in the tube reactor and stirrer-equipped vessel, the following values were obtained for the constitutional non-uniformity:

| | $\bar{E}$ w (% by wt.) | $\zeta$ w(% by wt.) | $\Omega$ w |
|---|---|---|---|
| Tube reactor | | | |
| Acrylonitrile | 71.0 | 10.0 | −0.35 |
| Vinyl acetate | 15.2 | 2.8 | −0.2 |
| Styrene | 13.8 | 12.9 | 0.36 |
| Stirrer vessel | | | |
| Acrylonitrile | 65.3 | 1.0 | 0 |
| Vinyl acetate | 24.5 | 0.3 | 0 |
| Styrene | 10.2 | 0.8 | 0 |

EXAMPLE 2

The conditions of the process employed in Example 1 were modified as follows:
Temperature of tube reactor: 70° C.
Residence time adjusted to 5.5 minutes.
These alterations did not alter the rate of flow of the streams of substance.

A degree of conversion of 30% was obtained in the tube reactor. The seed latex produced had a solids content of 5.5%. The total conversion (stages A + B) was 81% and the solids content of the latex was 18.5%. When the latex was worked up as in Example 1, a copolymer having the following properties was isolated:
Overall composition: Copolymerised units of
64.5% by weight acrylonitrile,
25.2% by weight of vinyl acetate, and
10.3% by weight of styrene.
K-value 61; $[\eta] = 0.76$,
Dye number: $\Delta E = 4.2$.

FIG. 4 represents the variation in particle size in dependence upon the polymerisation time obtained when the process is carried out in accordance with the instructions given in this Example. After an operating time of 5 to 6 hours, the particle size settles to a constant level of about 180 nm.

The materials obtained from the polymers by thermoplastic shaping are transparent.

The polymer produced in tube reactor stage A consists of polymerised units of
70.6% by weight of acrylonitrile,
20.0% by weight of vinyl acetate, and
9.4% by weight of styrene.
K-value: 61.5 $[\eta] = 0.77$.

The polymer obtained in the stirrer vessel B was found to have the following composition:
Copolymerised units of
62.7% by weight of acrylonitrile,
26.7% by weight of vinyl acetate, and
10.6% by weight of stryene.
K-value: 60.9: $[\eta] = 0.77$.

The following values were obtained for the constitutional non-uniformity of the polymers produced in the tube reactor and in the stirrer vessel:

| | $\bar{E}$ w (% by wt.) | $\zeta$ w (% by wt.) | $\Omega$ w |
|---|---|---|---|
| Tube reactor | | | |
| Acrylonitrile | 70.6 | 9.1 | −0.65 |
| Vinyl acetate | 20.0 | 3.8 | −0.31 |
| Styrene | 9.4 | 11.0 | 0.65 |
| Stirrer vessel | | | |
| Acrylonitrile | 62.7 | 1.2 | 0 |
| Vinyl acetate | 26.7 | 0.8 | 0 |
| Styrene | 10.6 | 0.8 | 0 |

EXAMPLE 3

Preparation of an acrylonitrile/vinyl acetate/styrene copolymer by the process according to the invention. The following solutions I, II, III and IV were used.

| Solution I | |
|---|---|
| Deionised water | 1000 parts |
| Potassium persulphate | 5.4 parts |
| Sulphuric acid (normal) | 35.0 parts |
| Tetrasodium salt of ethylenediaminotetracetic acid (0.2% by weight in water) | 10.0 parts |
| Solution II | |
| Deionised water | 1000 parts |
| Sodium pyrosulphite | 33.0 parts |
| Sodium laurylsulphate (30% by weight in water) | 60.0 parts |
| Commercial emulsifier as in Comparsion Example 2 (50% by weight in water) | 45.0 parts |
| Solution III | |
| Acrylonitrile | 560 parts |
| Vinyl acetate | 400 parts |
| Styrene | 40 parts |
| n-octylmercaptan | 3.5 parts |
| Solution IV | |
| Acrylonitrile | 716 parts |
| Vinyl acetate | 121 parts |
| Styrene | 224 parts |
| n-octylmercaptan | 4.0 parts |

Solutions I, II and III were transferred in the following proportions:
Solution I : 80 parts per hour
Solution II : 80 parts per hour
Solution III : 91 parts per hour
to a stirrer-equipped vessel kept at 0° C., and were vigorously mixed therein.

The resulting dispersion is passed through a tube reactor tempered at 65° C. (ratio of length of diameter 3000:1) by means of a dosing pump and polymerised in this reactor under non-stationary conditions.

| Dosing rate: | 251 parts per hour |
|---|---|
| Residence time in tube reactor: | 6.0 minutes |
| Conversion in tube reactor: | 30.0% by weight. |

The seed emulsion which has a solids content of 12.5% by weight when leaving the tube reactor is cooled and when conducted into a stirrer vessel kept at 53° C., where it is combined with the stream of solution IV fed in at the same time at the rate of 49 parts per hour. After a polymerisation time of 90 minutes, when the reaction volume is already constant, the resulting emulsion, which has a solids content of 42% by weight, is continuously discharged at the rate of inflow of the components by opening and overflow (residence time in stirrer vessel: 90 minutes).

After a continuous operating period of 7 hours, the particle size is established at a constant level of about 190 nm.

When the overall conversion over both stages is 85%, a polymer having the following properties is isolated after precipitation with aqueous aluminum sulphate solution, washing with water until the polymer is free from emulsifier and electrolyte and drying of the polymer at 60° C. to a residual moisture content of 0.4%:
Overall composition: Copolymerised units of
62.65% by weight of acrylonitrile,
23.0% by weight of vinyl acetate, and
14.35% by weight styrene.
K-value: 59.4, $[\eta] = 0.79$
Dye number: $\Delta E = 6.2$
Articles thermoplastically shaped from such a material are transparent.

The polymer produced in tube reactor stage A consists of copolymerised units of 68.05% by weight of acrylonitrile, 18.6 parts by weight of vinyl acetate and 13.35 parts by weight of styrene.
K-value: 61, $[\eta] = 0.85$.

The polymer obtained in stirrer vessel B was found to have the following composition:
Copolymerised units of:
61.05% by weight acrylonitrile,
24.3% by weight vinyl acetate, and
14.65% by weight styrene.
K-value: 59.1, $[\eta] = 0.77$ The polymers produced in the tube reactor and in the stirrer vessel were found to have the following constitutional non-uniformities:

| | $\bar{E}_w$ (% by wt.) | $\zeta_x$ (% by wt.) | $\Omega_w$ |
|---|---|---|---|
| Tube reactor | | | |
| Acrylonitrile | 68.05 | 8.95 | −0.43 |
| Vinyl acetate | 18.6 | 5.9 | −0.29 |
| Styrene | 13.35 | 14.8 | 0.38 |
| Stirrer vessel | | | |
| Acrylonitrile | 61.05 | 1.5 | 0 |
| Vinyl acetate | 24.3 | 0.5 | 0 |
| Styrene | 14.65 | 1.0 | 0 |

With the process according to the invention, in contrast to the process described in Comparison Example 1, it was also possible to prepare stable emulsions with high solids contents (>40% by weight).

We claim:
1. Mixtures of acrylonitrile/vinyl acetate/styrene terpolymers comprising
    (A) 10 to 30% by weight of a terpolymer of copolymerised units of acrylonitrile, vinyl acetate and styrene with weight averages of the composition $\bar{E}w$, standard deviation $\delta w$ and skewness of distribution $\Omega w$ as follows:

| | $\bar{E}w$ | $\delta w$ | $\Omega w$ |
|---|---|---|---|
| Acrylonitrile | 50–85% by wt. | 6–20% by wt. | −0.8 to 0.5 |
| Vinyl acetate | 10–26% by wt. | 3–10% by wt. | −0.5 to 0.4 |
| Styrene | 5–24% by wt. | 5–30% by wt. | −0.5 to 0.8 | and a K-value of 50 to 70 measured at 25° C. in a 0.5% by weight dimethylformamide solution, and
    (B) 70 to 90% by weight of a terpolymer of copolymerised units of acrylonitrile, vinyl acetate and styrene with weight averages of the composition $\bar{E}'w$, standard deviation $\delta'w$ and skewness of distribution $\Omega'w$ as follows

| | $\bar{E}'w$ | $\delta'w$ | $\Omega'w$ |
|---|---|---|---|
| Acrylonitrile | 50–85% by wt. | 0–2.0% by wt. | 0 |
| Vinyl acetate | 6–30% by wt. | 0–1.0% by wt. | 0 |
| Styrene | 9–20% by wt. | 0–1.0% by wt. | 0 | and a K-value of 55-70 measured at 25° C. in a 0.5% by weight dimethylformamide solution,
with the proviso that the difference between the styrene contents $\bar{E}w$ and $\bar{E}'w$ does not exceed 4% by weight and the K-values of the terpolymers A and B differ from each other by at the most 10.

* * * * *